United States Patent [19]

Giles

[11] Patent Number: 4,743,760
[45] Date of Patent: May 10, 1988

[54] METHOD AND APPARATUS FOR METERING FLOWABLE PARTICULATES

[75] Inventor: Alan F. Giles, St. Neots, Great Britain

[73] Assignee: Thomas J. Lipton, Inc., Englewood Cliffs, N.J.

[21] Appl. No.: 878,136

[22] Filed: Jun. 25, 1986

[30] Foreign Application Priority Data

Jun. 26, 1985 [GB] United Kingdom ............... 8516181

[51] Int. Cl.⁴ .................. G01F 13/00; G01V 9/04; B07C 5/02
[52] U.S. Cl. ........................... 250/222.2; 209/576; 364/555; 73/861.41
[58] Field of Search ............ 250/222.2, 222.1, 221; 377/10, 11, 53; 364/555; 209/551, 576–579; 73/861.04, 861.41, 861

[56] References Cited

U.S. PATENT DOCUMENTS

| | | |
|---|---|---|
| 3,588,480 | 6/1971 | Unger et al. . |
| 3,819,918 | 6/1974 | Hale . |
| 4,238,956 | 12/1980 | Sniezek et al. . |
| 4,294,014 | 10/1981 | Baumann et al. . |
| 4,513,868 | 4/1985 | Culling et al. ................ 209/576 |
| 4,528,680 | 7/1985 | Archambeault ............... 209/551 |
| 4,561,546 | 12/1985 | Maroney ....................... 209/551 |
| 4,588,091 | 5/1986 | Wade ............................. 364/555 |
| 4,635,215 | 1/1987 | Friend ........................... 364/555 |
| 4,675,520 | 6/1987 | Harrsen et al. ............... 250/222.2 |

FOREIGN PATENT DOCUMENTS 767796 9/1981 U.S.S.R. .

*Primary Examiner*—Edward P. Westin
*Attorney, Agent, or Firm*—Brumbaugh, Graves, Donohue & Raymond

[57] ABSTRACT

A method and apparatus for metering flowable particulates wherein the particulates are fed at a uniform speed through an array of radiation beams, the interruptions of these beams are used to compute a value representing the total amount of particulates present in the array of beams and this value is totalized with time. This totalized value is used for monitoring the flow of particulates.

8 Claims, 1 Drawing Sheet

METHOD AND APPARATUS FOR METERING FLOWABLE PARTICULATES

BACKGROUND OF THE INVENTION

The invention relates to a method and an apparatus for metering flowable particulates.

In this specification the expression "particulates" is used for both solids and liquids which may be dispersed in a gas or a liquid.

Particulates are generally metered by bulk volume or by weight but both systems are either time-consuming or inaccurate.

SUMMARY OF THE INVENTION

The invention now provides a method of metering flowable particulates wherein these particulates are fed at a uniform speed as a flow through an array of radiation beams, the radiation and the medium surrounding the particulates being selected such that this medium is more transmissive for the radiation than the particulates are; the direction of the beams crosses the direction of travel of the particulates; the obstructions of the beams by particulates are detected; a value is computed therefrom which represents the total amount of particulate material present in the array of beams, these values are totalized with time and the flow of particulates is monitored in dependence on this totalized value.

In this specification the expression "uniform speed" is intended to comprise any case wherein the individual particles on passing through the radiation beams have about the same velocity, regardless of possible acceleration.

In a preferred embodiment the particulates are fed at a uniform speed through the array of beams by allowing them to fall from a defined height above these beams.

Suitably an array of parallel radiation beams is used, care being taken that the detectors only respond to the corresponding radiation source. To this end, conveniently pulsed radiation sources are used, the radiation pulses emitted thereby being detected by corresponding, timed, synchronized detectors and the missing pulses are detected. Hereby it is ensured that radiation from each radiation source produces a measured response only in its corresponding detector. This may be achieved by mechanical collimation as well, but this would require an increased path length for the radiation and have other disadvantages.

In order that the effect of ambient radiation and electronic circuit drift is eliminated it is preferred that a signal generated by the amount of radiation received by the detector with its respective radiation source not energized or turned off is subtracted from the signal generated by the amount of radiation received when that radiation source is energized or turned on.

In order to provide uniformity of sensing for all radiation source-detector combinations across the measurement aperture through which the particulates are to be fed, the transfer function of each source detector combination is memorized and subsequently used to correct received radiation values to a uniform sensing value.

For obtaining an improved accuracy, preferably two arrays of parallel beams are used, the directions of which cross, suitably at a right angle.

In order that varying particle sizes are accounted for, the number of obstructions in the one set of beams is multiplicated with that in the other set and divided by the total number of particles computed from the interruptions in the detected obstructions in one direction, while selecting the greater value if these interruptions are detected in two directions.

In all other cases the number of obstructions can simply be totalized.

The accuracy can also be improved by allowing the flowing particles to fall in a plane which does not comprise a direction of any radiation beam and which very suitably comprises the bisector of the angle formed by the directions of the two sets of parallel beams if such two crossing sets of beams are used as described above.

In a very simple but mostly sufficiently accurate embodiment, one radiation source is used, which is positioned preferably centrally with respect to the detectors.

The above method may be used such that the amount of particulates which has passed through the array of beams is separated from the subsequent stream of particulates after a predetermined value of the totalized value has been reached. In this mode the method is suitable for obtaining equal portions of the particulates. After calibration for a given material, portions of about equal weight can be obtained.

In another mode the value of the integral for a predetermined time is used for decreasing or increasing the flow rate of the particulates. This method may also be used for controlling the interrelationship between several flows of particulates.

The invention also relates to apparatus for metering flowable particulates comprising a frame member having at least one radiation source for transmitting an array of radiation beams and having a plurality of detectors for receiving said beams, feeding means for separately feeding the particlates at a uniform speed as a flow through said beams, means for conducting information about obstructions of the beams between the source and the detectors to a computing means, the computing means being adapted to compute a value from the detected obstructions which represents the total amount of particulate material present in the array of beams and means for monitoring the flow of particulates beyond the beams in dependence of this value.

In a first preferred embodiment of this apparatus the feeding means are provided with a conveying means ending above the frame member, such that the particulates conveyed by the conveying means are allowed to fall through said frame member, between at least one source and the detectors. Other preferred embodiments of the apparatus are those adapted for putting the above described preferred methods into practice, such as those having two arrays of crossing beams.

The invention in a particularly preferred embodiment relates to an apparatus for dosing solid particulates comprising a feeding conveyor, a checking device, computing means, parting means and discharge means, wherein the feeding conveyor has its discharge end above the checking device which comprises at least one radiation source and a plurality of radiation detectors, at least the detectors being in a working relationship connected to the computing means and the computing means controls the actuation of the parting means.

In a preferred embodiment the checking device is in a working relationship connected to the computing means.

In order to increase the accuracy of the apparatus it is to be preferred that in the passage leading from the checking device to the parting means, a second parting means is arranged.

In a simple embodiment only one radiation source is arranged in the centre of a series of detectors which are positioned along a circle. For obtaining a suitable accuracy, the feeding means for feeding the particulate materials are preferably arranged such that the particulate material is allowed to drop as a curtain concentric around the radiation source.

In an apparatus for making equal portions by weight it is to be recommended that a check weighing means is provided for weighing the contents. These check weighing means are preferably in a working relationship connected to the computing means.

The invention will be described more fully on the basis of the following embodiments and the attached schematic representations.

DETAILED DESCRIPTION OF THE INVENTION

Figure 1:
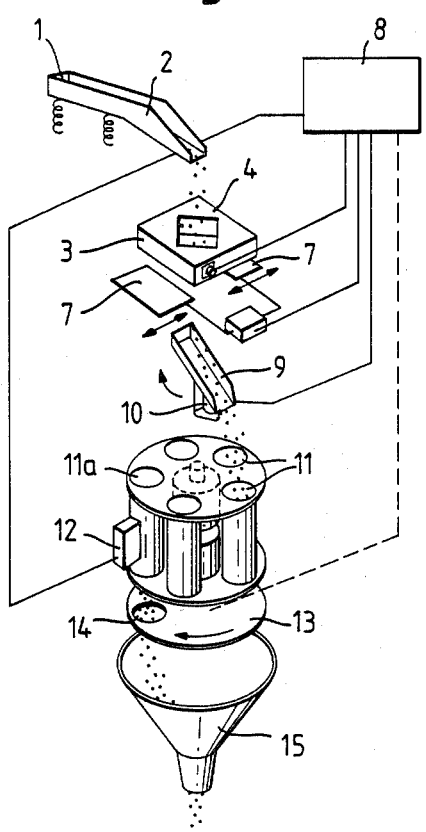
FIG. 1 is an exploded schematic view of a preferred embodiment of a device according to the invention, comprising the electronic circuitry in a block diagram.
Figure 3:
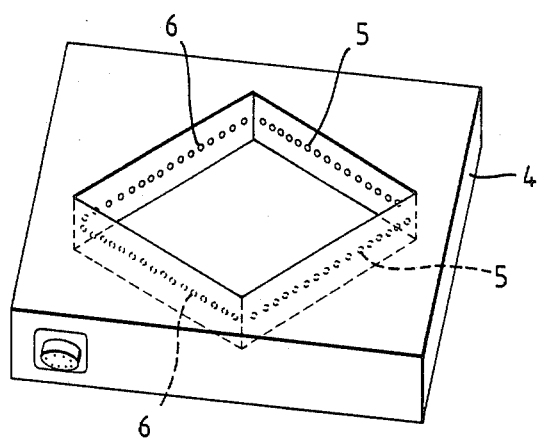
FIG. 3 is a top view of a portion of the embodiment of FIGS. 1 and 2.

The dosing apparatus of FIG. 1 comprises a vibratory feeder 1, the delivery chute 2 of which ends above a checking device 3 which in detail is shown in FIG. 3.

The checking device 3 comprises a frame 4 defining a square aperture forming a passage for material falling from the end of the delivery chute 2. Two adjacent sides of said aperture are provided with a series of light emitting devices 5 and the opposite sides with corresponding series of light detecting devices 6 such as photo transistors, the light emitting devices 5 and light detecting devices 6 being arranged in pairs such that light emitted by the emitting device of each pair is received by the detecting device of said pair. These light beams between two opposite sides being parallel and making a right angle with the direction of the light beams between the other two opposite sides of the aperture.

Closely under the checking device, a parting means formed by a pair of shutters 7 is arranged which is actuated by computing means 8, connected to the light detecting device 6 in a working relationship.

The computing means 8 controls an indexing motor 10 of a revolving, slanting chute or deflecting means 9, guiding the material falling through the apparatus to any of a circular series of buffer chambers 11. This chute, which is rotatable in a controlled manner, forms the second parting means.

Part of one of the buffer chambers 11a is mounted on a load cell 12 for checking the weight of material contained in said chamber 11a. The data provided by said load cell is fed to the computing means 8.

The buffer chambers are provided with discharge means, such as a rotatable disk 13 having one aperture 14 which may be brought in line with the open underside of any buffer chamber 11 when its contents are to be delivered in a funnel 15 opening in a packaging machine (not shown).

The working of the apparatus is as follows: particulate material is fed by the vibratory feeder 1 through the delivery chute 2 and falls freely as a curtain which is generally in a vertical plane.

The particulate material falls through the square aperture of the checking device 3 and obstructs the radiation beams between the light emitting devices 5 and the corresponding light detecting devices 6.

These obstructions are recorded by the computing means 8 and totalized until a predetermined value is reached, being representative for the amount of material which passed through the checking device. Now an activating signal is given to the pair of shutters 7, which are closed, and to the indexing motor 10 to move the slanting chute 9 to have its dispensing end above the next buffer chamber 11. Thereafter the pair of shutters are opened again and the material is received in the next buffer chamber. This continues until the predetermined value is reached again and the above described procedure is repeated.

The buffer chamber 11 may be emptied into the funnel 15 by bringing the aperture 14 in the disk 13 in line with the open underside of said chamber. The actuation of this disk may be controlled by the computing means 8 as well.

Figure 2:
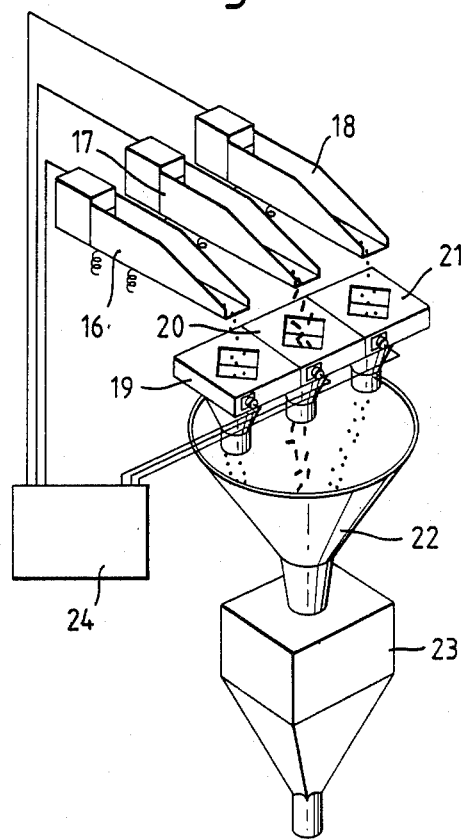
FIG. 2 is a schematic view of an alternative embodiment of a device according to the invention.

In FIG. 2 schematically three feeders 16–18 and three corresponding checking devices 19–21 are shown, delivering the particulates as three separate streams in a common funnel 22 guiding the particulates to a mixing device 23. The data obtained from the checking devices are separately fed to a computer means 24 in which for a preset period the obstructions of the radiation beams in the checking devices are totalized. Dependent on the value obtained thereby the drive of the respective feeder may be influenced so as to obtain a predetermined value.

This procedure may be repeated for every combination of feeder and checking device at predetermined intervals of time.

FIG. 3 shows in more detail a checking device. The frame 4 defines a square aperture. Two adjacent sides thereof are each provided with a plurality of light emitting devices 5 and the opposite sides each with an equal plurality of light detecting devices 6. The emitting and detecting devices are arranged such that the light beams between pairs of emitting and detecting devices are parallel.

The methods and apparatus according to this invention can suitably be used for handling dry, free flowing particulate materials, but also fishes and prawns entrained in a stream of water and drops of a liquid freely falling in a gas for example.

Several modifications will occur to those skilled in the art when reading the above specification. These modifications are well within the scope of the invention. For instance, the parting means are exemplified by a pair of shutters and by a rotatable, slanting conduit. This may suitably be a container which is open at the top and at the bottom, the bottom opening of which being openable and closable in a well controlled manner by one or two shutters, an apertured disc, such as the one indicated by numeral 13 in FIG. 1 and similar devices.

I claim:

1. A method of metering flowable particulates wherein these particulates are fed at a uniform speed as a flow through an array of radiation beams, the radiation and the medium surrounding the particulates being selected such that this medium is more transmissive for the radiation than the particulates are; the direction of the beams crosses the direction of travel of the particulates; the obstructions of the beams by particulates is detected; a value is computed therefrom which represents the total amount of particulate material present in the array of beams, these values are totalized with time and the flow of particulates is monitored in dependence on this totalized value.

2. A method according to claim 1, wherein the flowing particulates generally fall in a plane not comprising a direction of a radiation beam.

3. A method according to claim 1, wherein pulsed radiation sources are used, the pulses emitted thereby are detected with corresponding, time-synchronized detectors and the missing pulses are detected.

4. An apparatus for metering flowable particulates comprising a frame member having at least one radiation source for transmitting parallel radiation beams and having a plurality of detectors for receiving said beams, feeding means for separately feeding the particulates at a uniform speed as a flow through said beams, means for conducting information about obstructions of the beams between the sources and the detectors to a computing means, the computing means being adapted to compute therefrom a value which represents the total amount of particulate material present in the array of beams and to totalize these values with time and means for monitoring the flow of particulates beyond the beams in dependence on this totalized value.

5. An apparatus according to claim 4, wherein the feeding means are provided with a conveying means ending above the frame member, such that the particulates conveyed by the conveying means are allowed to fall through said frame member, between the sources and the detectors.

6. An apparatus according to claim 5, wherein the conveying means includes a dispensing end through which particulates may be discharged so that they fall downwards in a substantially vertical plane not comprising a direction of any of the radiation beams.

7. An apparatus for dosing flowable particulates comprising a feeding conveyor having a discharge end; a computing means; a checking device below the discharge end, the checking device having at least one radiation source and a plurality of radiation detectors, the detectors being in a working relationship with the computing means; a parting means which is controlled by the computing means and disposed in the path of particulates; and a check weighing means arranged in the path of particulates below the parting means and connected to the computing means in a working relationship.

8. An apparatus according to claim 7, wherein in the path of travel of the particulates leading from the checking device to the parting means a second parting means is arranged.

* * * * *